July 18, 1939.                E. LAKATOS                 2,166,359
                         MAGNETOSTRICTIVE DEVICE
               Filed March 30, 1937          3 Sheets-Sheet 1
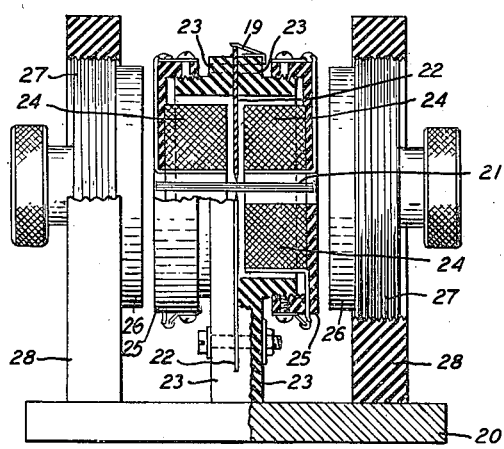
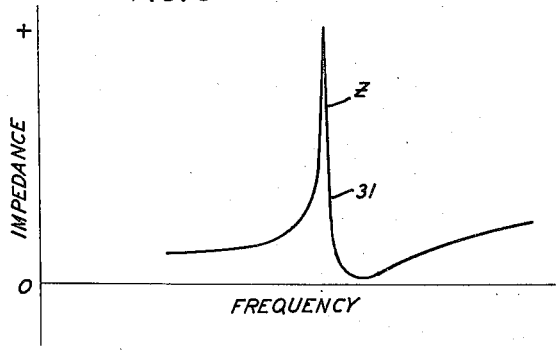
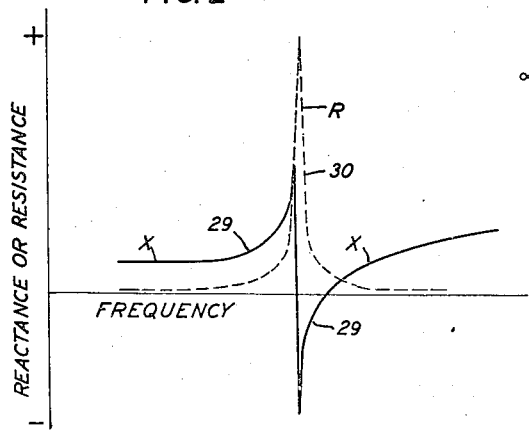
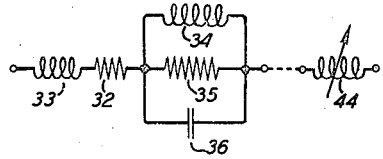
INVENTOR
E. LAKATOS
BY
ATTORNEY July 18, 1939.　　　　　E. LAKATOS　　　　　2,166,359
MAGNETOSTRICTIVE DEVICE
Filed March 30, 1937　　　3 Sheets-Sheet 2
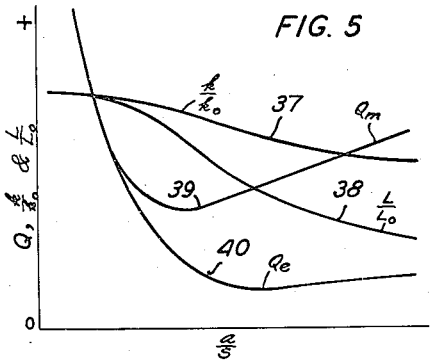
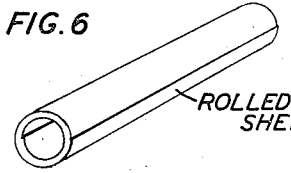
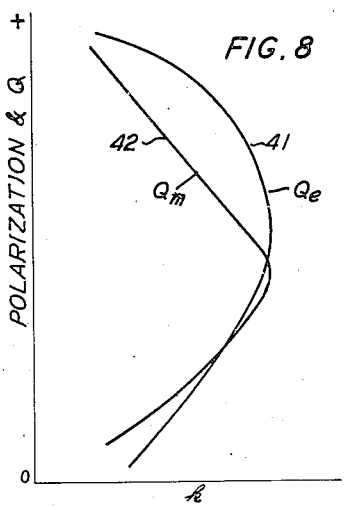
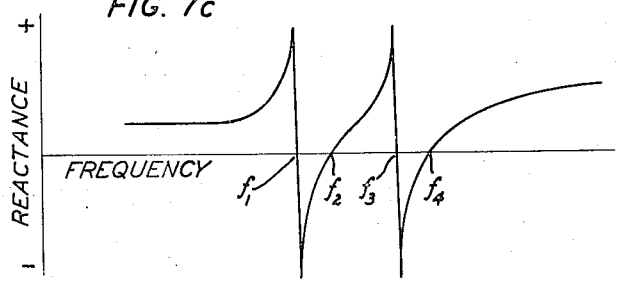
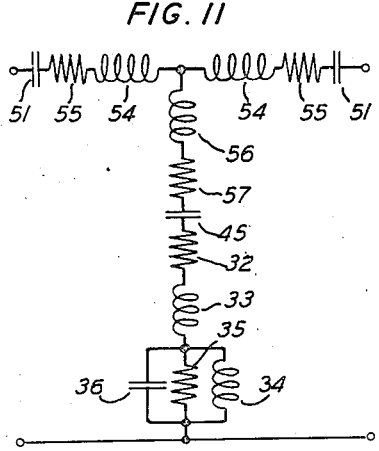
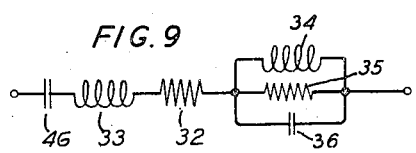
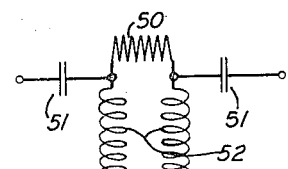
INVENTOR
E. LAKATOS
BY E. V. Griggs
ATTORNEY July 18, 1939. E. LAKATOS 2,166,359
MAGNETOSTRICTIVE DEVICE
Filed March 30, 1937 3 Sheets-Sheet 3
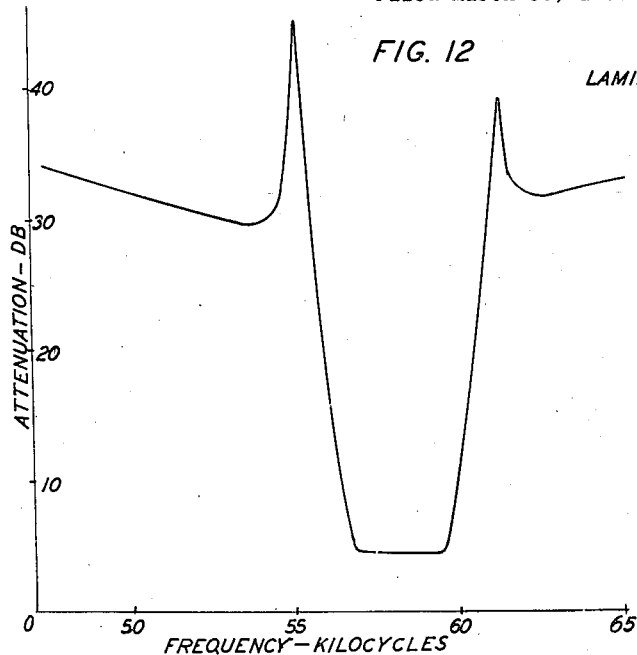
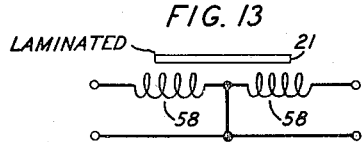
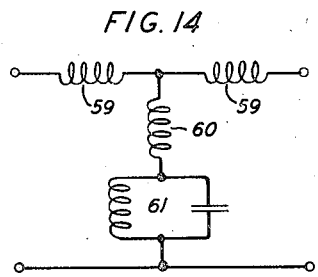
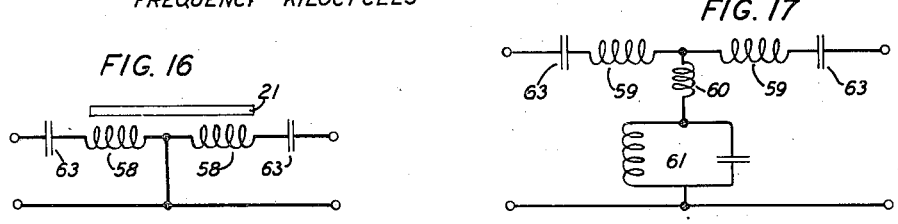
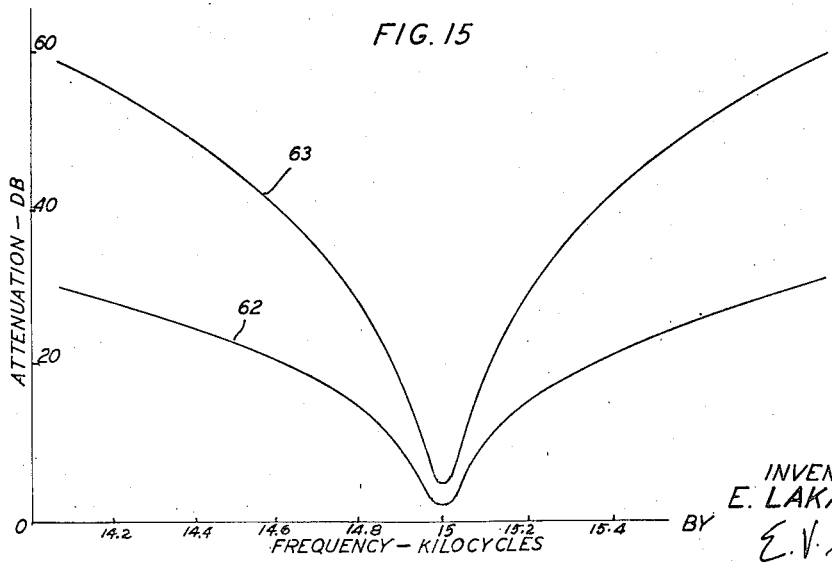
INVENTOR
E. LAKATOS
BY
E. V. Griggs
ATTORNEY Patented July 18, 1939

2,166,359

UNITED STATES PATENT OFFICE 2,166,359

MAGNETOSTRICTIVE DEVICE

Emory Lakatos, New York, N. Y., assignor to Bell Telephone Laboratories, Incorporated, New York, N. Y., a corporation of New York Application March 30, 1937, Serial No. 133,837

9 Claims. (Cl. 178—44)

This invention relates to improved methods of and apparatus for developing and utilizing effects resulting from the phenomena known as magnetostriction.

Magnetostrictive effects have been observed by a number of investigators within the past fifty years or more, and a narrowly localized decrease, usually in the order of from 10 to 30 per cent, in the electrical impedance of a coil associated with a polarized vibrating element of magnetostrictive material having a predetermined frequency of mechanical resonance, has been observed at or near the frequency of mechanical resonance. This effect has been employed to obtain frequency selection and stabilization in a number of vibratory and oscillatory systems.

The effectiveness and usefulness of magnetostrictive devices proposed in the prior art are seriously limited by the fact that the resistive or dissipative properties of these devices are generally of comparable magnitude with the reactive properties. As a consequence of this, the dissipative properties have not only damped such reactive effects as have been obtained, but have totally obscured other valuable reactive properties which may be obtained by properly designed magnetostrictive devices.

Usually, also, the coupling between the electrical and mechanical elements of magnetostrictive devices, as disclosed in the prior art, is so small that appreciable magnetostrictive reaction of the mechanical element upon the electrical circuit is confined to an extremely narrow frequency range about the frequency at which the mechanical element is resonant. The minimum value of impedance of the coil has apparently heretofore been considered as evincing an electrical resonance occurring at the frequency of mechanical resonance of the polarized vibrating element as a direct and natural result of the mechanical resonance. Viewed from its physical aspects, however, it would seem more reasonable that at the frequency of maximum vibration or motion of the vibrating element, that is at its mechanical resonance, there should be induced in the associated coil a maximum electrical impedance or an electrical anti-resonance.

This invention discloses that pronounced electrical anti-resonant effects may in fact be obtained by magnetostrictive devices designed in accordance with the principles disclosed hereinafter and that such devices are also capable of producing very much sharper resonant effects than have heretofore been obtained. By way of illustration models constructed in accordance with the principles of this invention have produced anti-resonant effects in which the electrical impedance of the coil at anti-resonance is approximately fifteen times its value at frequencies remote from "critical" frequencies. "Critical" frequencies are frequencies at which resonant or anti-resonant conditions occur. The same models have produced resonances at which the impedance was less than 10 per cent of its value at frequencies remote from critical frequencies.

Not only can these two effects be obtained with a single device of this invention and the frequency interval between the effects varied within appreciable limits, but also as will be hereinafter disclosed, the over-all impedance characteristics of the devices can be made to closely simulate the characteristics of high grade electrical networks which would require in their construction a plurality of the more conventional types of electrical reactive elements. The magnitude and character of the impedance and reactive effects obtainable and the control afforded over them by devices embodying the principles disclosed in this invention, are such as to make the devices particularly valuable for use in wide and narrow band electrical wave filters and numerous electrical frequency selective and stabilizing circuits.

In many instances desired reactive effects may be obtained more economically by devices of this invention and in some circumstances the reactive effects desired can as a practical matter be obtained only through the use of these devices. A particular field of usefulness for magnetostrictive devices of this invention appears to be in the frequency range extending from approximately 15 to 100 kilocycles. In this range they operate with facility and offer a convenient solution to some filter and network design and construction problems which cannot be readily solved with devices of the prior art.

While the specific embodiments chosen to illustrate the principles of this invention hereinafter are devices providing novel electrical impedance properties, it is, of course, obvious that by virtue of greater efficiency, higher coupling and more complex frequency reactive characteristics, magnetostrictive devices of this invention are more suitable and effective than magnetostrictive devices of the prior art as activating and controlling elements for sound emitting and receiving devices, frequency generating, indicating and controlling devices, magnetostrictive relays, repeaters and numerous similar devices. It is anticipated, therefore, that numerous applications of the principles and devices of this invention to electromechanical and electromagnetic systems will occur to those skilled in the art.

An object of the invention is to provide methods of and apparatus for employing the phenomena of magnetostriction to greater advantage.

Another object of the invention is to provide cheaper and better reactive devices for use in broad and narrow band electrical wave filters.

Another object of the invention is to provide more efficient and more effective magnetostrictive frequency-selective and frequency-stabilizing devices for electrical systems.

Other objects and advantages of the invention will be apparent during the course of the following description.

In the accompanying drawings:

Fig. 1 shows a sectional view of a magnetostrictive device embodying one form of the present invention;

Fig. 2 shows electrical reactance and resistance curves of the magnetostrictive device of Fig. 1;

Fig. 3 shows the electrical impedance curve of the magnetostrictive device of Fig. 1;

Fig. 4 shows a schematic of one form of electrical network, the impedance of which may be simulated by the magnetostrictive device of Fig. 1;

Fig. 5 shows the effect upon the coupling factor, the damped inductance and the mechanical and electrical efficiencies of varying the thickness of the laminations of the vibrating element of a magnetostrictive device of this invention;

Fig. 6 shows an alternative form of vibrating element for a magnetostrictive device of this invention;

Fig. 7A shows a vibrating element having portions of different cross-sectional areas symmetrically distributed about its center point;

Fig. 7B shows the equivalent electrical network of a magnetostrictive device employing a vibrating element of the type shown in Fig. 7A supported at its mid-point;

Fig. 7C shows the electrical reactance of a magnetostrictive device employing a vibrating element of the type shown in Fig. 7A supported at its mid-point;

Fig. 8 shows the variation in electrical and mechanical efficiencies with polarization plotted against the coupling factor of a magnetostrictive device of this invention;

Fig. 9 shows in schematic form an electrical condenser connected in series with a magnetostrictive device of this invention and is employed in describing a simplified method of determining the properties of the magnetostrictive device;

Fig. 10 illustrates in schematic form one method of associating a magnetostrictive device of this invention with a number of the more usual forms of electrical reactors to construct a broad band electrical wave filter;

Fig. 11 shows an equivalent electrical schematic of the structure indicated in Fig. 10;

Fig. 12 shows the transmission characteristics of the structure of Fig. 10;

Fig. 13 shows in diagrammatic form a method of employing a magnetostrictive device as a band-pass electrical wave filter;

Fig. 14 shows one form of equivalent electrical network for the device of Fig. 13;

Fig. 15 shows typical transmission characteristics for a device of the type of Fig. 13;

Fig. 16 shows a device of the type shown in Fig. 13 in combination with two electrical condensers; and Fig. 17 shows one form of equivalent electrical network for the combination of Fig. 16.

One embodiment of this invention is shown in Fig. 1 and comprises a member of magnetostrictive material 21, supports 22 for the member 21, a standard 23 mounted on a base 18 and holding supports 22, an electrical coil 24 divided into halves, each half being wound on a spool 25 having a threaded rim which engages the threads of a hole in the standard 23, permanent magnets 26 mounted on the phenol fibre discs 27, the discs being threaded, and magnet supports 28, these supports each containing a threaded hole to receive the discs 27 and being assembled on the base 18 with standard 23.

The member 21 is resonant mechanically at 60 kilocycles and is constructed of six laminations of the alloy, 45 parts nickel, 5 parts molybdenum and 50 parts iron, the laminations being .002 inch thick, 1½ inches long and $\tfrac{3}{16}$ inch wide.

The supports 22 are made of phenol fibre and are arranged to hold the member 21 at its transverse center line, the edges of the supports 22 in contact with the member 21 being ten mills thick. These supports should exert just sufficient pressure upon the member 21 to hold it in place, as greater pressure would tend to damp the magnetostrictive activity of the member. In Fig. 1 this pressure is provided by spring 19. The use of a material which is resilient, such as phenol fibre, for these supports obviously still further decreases the damping effect of the supports.

The coil 24 is divided into halves, each containing 200 turns of No. 37 stranded, seven-strand wire. The coil construction facilitates placing the supports 22 and provides by virtue of the threaded mounting a fine adjustment to secure the exact inductance desired by varying the mutual between the half windings. If, as is the usual case, a high degree of coupling is desired between the coil and the member 21, the clearance between them should be just sufficient to permit free movement of the member.

The threaded mounting of the permanent magnets 26 permits precise adjustment of the magnetic polarization of the member 21, which, as will hereinafter appear, is important.

To an appreciable extent, the character of the effects which may be obtained by the magnetostrictive action of the member 21 are dependent upon the degree of coupling between the member 21 and the electrical coil 24.

As will be explained hereunder the electrical characteristics of devices of this invention are of the types shown in Figs. 2 and 3. Curve 30 of Fig. 2 shows a typical resistance characteristic and curve 29 of Fig. 2 shows a typical reactance characteristic. Curve 31 of Fig. 3 shows a typical impedance characteristic; Fig. 4 shows a schematic of one form of electrical network having electrical characteristics of these same types as will be explained in detail hereinafter. For the device of Fig. 1 anti-resonance occurs at 60 kilocycles and resonance occurs 300 cycles higher in frequency.

It has been found that an important factor in determining the degree and effectiveness of the coupling between a magnetostrictive member and its associated electrical circuits is the shielding effect of the eddy currents which may be induced in the member. An analysis of the shielding effect of eddy currents in inductance coil cores is given by Mr. K. L. Scott in the Proceedings of the I. R. E., volume 18, No. 10, October 1930, pages 1750 to 1764, inclusive. An important fact brought out by this analysis is that the shielding effect of eddy currents can be effectively eliminated only by carrying the process of lamination to the use of relatively very thin laminations. In connection with devices of this invention it was furthermore found that even slightly thicker laminations not only do not effectively eliminate the shielding effect of eddy currents but also actually introduce more dissipation than if the core were not laminated.

The broad statement that lamination of the vibrating element will improve the operation of the device is therefore misleading.

Curves 37, 38, 39 and 40 of Fig. 5 show the variations of the coupling factor, the damped inductance and the mechanical and electrical efficiencies, respectively, of a magnetostrictive device of the type illustrated in Fig. 1 with lamination thickness. These curves are percentage curves each showing the ratio of the value of the property for a particular lamination thickness to the value of the same property in the absence of eddy currents.

The coupling factor, as its name suggests, is a measure of the degree of coupling between the electrical coil and the magnetostrictive member. It is expressed by the formula $$k = \sqrt{\frac{L_m}{L_e + L_m}} \quad (1)$$

where $L_m$ is the component of inductance arising in the coil by virtue of the magnetostrictive activity of the core and $L_e$ is the inductance the coil would have if the core were damped so that it could not vibrate by magnetostrictive action. Inductance $L_e$ will be hereinafter referred to as the damped inductance. Curve 37 of Fig. 5 shows the ratio of the actual coupling factor to the coupling factor in the absence of eddy currents.

Curve 39 of Fig. 5 shows the ratio of the actual damped inductance to the damped inductance in the absence of eddy currents. The mechanical and electrical efficiencies are expressed by the symbols $Q_m$ and $Q_e$, respectively. These symbols designate the ratio of reactance to dissipation for the mechanical and electrical systems of the device, respectively, and the effect of lamination thickness upon them is shown by curves 39 and 40, respectively, of Fig. 5.

Lamination thickness is expressed by the ratio $$\frac{a}{s}$$

where $a$ is half the lamination thickness and $s$ is the "skin thickness" of the material and may be determined by computing the value of the expression $$\frac{5030}{\sqrt{\mu \gamma f}}$$

where $\gamma$ is the permeability of the material in Maxwells per square centimeter per Gilbert per centimeter, $\mu$ is the electrical conductivity of the material in ohms per cubic centimeter and $f$ is the frequency of the impressed electromotive force in cycles per second.

Early experiments with magnetostrictive elements laminated in accordance with the above theory did not give the expected improvement in operating qualities and it was found that these could be realized only if the laminations of the elements fitted accurately and compactly together when assembled and were bound tightly together at all points of contiguous surfaces by a thin film of strongly adhesive material, the adhesive material having, of course, good electrical insulating properties to prevent the circulation of eddy currents. A good grade of shellac and various lacquers have been found to be satisfactory binders for this purpose. The requirement to be fulfilled by the assembled element in respect to mechanical properties for maximum effectiveness appears to be that it shall approach as nearly as possible a similar one-piece element.

While the element 21 shown in Fig. 1 is a laminated bar of uniform rectangular cross-section and this form is very convenient for many magnetostrictive devices, other forms, such as tubes formed by rolling sheet metal as illustrated in Fig. 6 may, of course, be used. Whatever form of element is used the component parts of metal must, of course, be sufficiently thin to effectively reduce eddy currents and adjacent layers must fit compactly and be bound firmly together by a thin film of insulating adhesive material.

While the dimensions of the magnetostrictive elements must be chosen so that the frequencies at which the elements are mechanically resonant are those at which electrical anti-resonance is desired, the mass and to some extent the distribution of the mass of the elements may be varied within appreciable limits when the magnetostrictive elements are made to vibrate longitudinally as is the case with the device of Fig. 1. The magnitude and distribution of the mass, within the limits which permit the retention of the desired mechanically resonant properties, have ordinarily a considerable effect upon the characteristics of the magnetostrictive device. It has been found experimentally that by increasing the mass substantial increases in the efficiency of the device may frequently be obtained. Such adjustment of the mass may be considered as being in the nature of an adjustment of the "impedance" of the mechanical system.

It has been shown in the copending application of R. B. Blackman, Serial No. 35,918, filed August 13, 1935, now Patent No. 2,091,250, issued August 31, 1937, that additional mechanical resonant frequencies non-harmonically related may be introduced in the frequency range of greatest interest by employing a vibrating element having dissimilar cross-sectional areas for two or more portions of the element symmetrically distributed about its center. By employing the principles disclosed in this copending application to the construction of a vibrating element for a magnetostrictive device of this invention, a plurality of resonant and anti-resonant frequencies non-harmonically related may be obtained in the electrical characteristic of the device with a single vibrating element. A vibrating element of this type is illustrated in Fig. 7A. An equivalent network for a magnetostrictive device having a vibrating element of the type illustrated in Fig. 7A is shown in Fig. 7B and its reactive characteristic is shown in Fig. 7C and contains two anti-resonant frequencies $f_1$ and $f_3$ and two resonant frequencies $f_2$ and $f_4$.

For best results the vibrating elements of magnetostrictive devices of this invention should be annealed. Annealing the element at low temperatures in the neighborhood of 600° C. imparts stability to the magnetostrictive device, while annealing at higher temperatures in the neighborhood of 1000° C. results in increasing the electrical and mechanical efficiencies and the coupling factor of the device but makes it more sensitive to ordinary changes in room temperature and polarization. If not annealed, stresses set up during the manufacture of the vibrating element may very substantially decrease the efficiency and effectiveness of the magnetostrictive device.

Tests of magnetostrictive devices have indicated that appreciable dissipation and shielding effects may be contributed by the polarizing means employed. The commonly used method of producing the desired degree of polarization of the vibrating element by an electromagnetic field introduces substantial practical difficulties in that a high grade inductance coil must be employed in the polarizing current circuit to avoid deleterious effects and the voltage of the circuit must be maintained within close limits to obtain stability.

The deleterious effects of the practical difficulties involved in the use of other methods of polarization may be avoided by employing permanent magnets of special material and construction as polarizing means. Such magnets should have a high coercive force so that the coupling with the electrical coil of the device is effectively reduced. Furthermore, the material of the magnets should have a high resistivity so that eddy currents are largely eliminated and it should also have a high magnetizing force so that relatively small magnets will suffice to provide a polarizing field of the desired strength.

One material having these characteristics is described in U. S. Patent 1,997,193 issued April 9, 1935 to Messrs. Y. Kato and T. Takei. This material consists of powdered oxides of iron and cobalt mixed and formed under pressure and heat into the desired shapes. The coercive force of this material is from three to five times that of carbon steels, cobalt steel and similar alloys previously employed where high coercive force was desired. The electrical resistivity of this material is over ten times as large as that of powdered metallic magnetic materials depending upon insulating binders for high resistivity. High resistivity is inherent in these oxides themselves and this characteristic facilitates heat treating and forming processes. Measurements of this material have shown its remanence to be between 2500 and 3700 gauss, its coercive force to be between 300 to 1000 oersteds and its resistivity to be between 10,000 and 100,000 ohm centimeters. The magnets 26 shown in Fig. 1 are manufactured of this material and are in the form of discs 2⅜ inches in diameter and ⅜ inch thick.

Since the largest magnetostrictive effects are usually obtained when the vibrating element is magnetically polarized so as to be at or near its magnetic saturation point, the possible deleterious effects resulting from the necessity of polarizing the vibrating element can be still further reduced by constructing the vibrating element of an alloy, one constituent of which is introduced to decrease the magnetic saturation point of the alloy without a corresponding reduction in its magnetostrictive activity or deleterious effects upon its mechanical properties, so that the desired degree of polarization can be obtained with a weaker polarizing field. By way of illustration and as a particular example of the application of the above-stated general principle, a constituent found satisfactory for this purpose with nickel-iron alloys containing approximately 45 parts of nickel is molybdenum, approximately 5 per cent being found sufficient for this purpose.

The strength of the magnetic field required to polarize this material to the saturation point is approximately half that required for a similar alloy of nickel and iron employing no molybdenum.

It was found that vibrating elements made of an alloy having 45 parts nickel, 5 parts molybdenum and the balance iron were satisfactory in that they displayed large magnetostrictive properties, a low inductance-temperature coefficient, and could be polarized to the requisite degree with facility. Since an important field contemplated for the use of these devices is that of furnishing electrical reactive properties, stability of inductance with temperature changes is a valuable characteristic.

The importance of polarizing the vibrating element to the proper degree is made evident by the curves 41 and 42 of Fig. 8 which represent the variations of the coupling factor $k$, the electrical efficiency $Q_e$ and the mechanical efficiency $Q_m$ with polarization, respectively. These curves apply to the device of Fig. 1 designed to operate at about 60 kilocycles as a mid-band frequency and show that the coupling factor at first increases with polarization and after reaching a maximum value decreases. Thus, to obtain a desired coupling factor less than the maximum, either of two degrees of polarization could be employed. However, at the higher polarization, curves 41 and 42 show that increased electrical and mechanical efficiencies are obtained. The higher polarization should therefore be employed. For example, with the device of Fig. 1 where a 4 per cent coupling factor is desired, at the lower polarization a mechanical efficiency $Q_m$ of 500 and an electrical efficiency $Q_e$ of 30 are obtained, while for the higher polarization for the same coupling factor a mechanical efficiency of 2150 and an electrical efficiency of 129 are obtained.

From curves 41 and 42 of Fig. 8 it is also obvious that the degree of polarization must be accurately maintained at the desired point as the essential electrical characteristics of the device change if the polarization is permitted to change.

As a practical matter fine adjustments of the location of the electrical anti-resonance of the magetostrictive device may also be made by adjusting the polarization of the vibrating element and the exact coupling factor may then be obtained by adding a small adjustable inductance 44, as indicated in Fig. 4, in series with the magnetostrictive device.

In constructing magnetostrictive devices of this invention, the design of the electrical coil must take into consideration the degree of coupling, the electrical and mechanical efficiencies and the magnitude of the impedances required. The coil of the device of Fig. 1 has an impedance at frequencies remote from critical frequencies of approximately 1000 ohms.

In general, the impedance of the device at frequencies well removed from the critical frequencies is determined in the same manner as for a similar inductance coil of the same construction and dimensions having a core of the same size, shape and material as the vibrating element. In the usual case it will be desirable to make this impedance as nearly a pure inductance as practicable.

As stated above, to obtain effective coupling with the magnetostrictive member, the coil should be as closely associated physically with the vibrating element as is consistent with the requirement that the element be free to vibrate mechanically. Somewhat greater electrical efficiency may be obtained through a sacrifice in the magnitude of the coupling factor by grouping the winding more centrally and employing somewhat larger wire in winding the coil. The proper balance between the factors involved must be reached by experiment and experience.

The coupling factor, as above stated, is a measure of the degree of coupling between the magnetostrictive element and the electrical coil of the device and is expressed by the formula (1) above, where $L_m$ is the inductive component arising from the magnetostrictive activity of the magnetostrictive element and $L_e$ is the damped inductance of the coil. Since the magnetostrictive activity of the magnetostrictive member induces an anti-resonance in the electrical coil, the impedance so induced is electrically equivalent to a coil in parallel with a condenser, the coil having the inductance $L_m$ and the condenser having that value of capacity necessary to produce the anti-resonance at the frequency at which the magnetostrictive element is mechanically resonant. Above this frequency a capacitative reactance will be induced in the coil by the motion of the magnetostrictive element and this will resonate with the damped inductance of the coil at a frequency determined by the relation between the magnitudes of these two reactances which is the same as the ratio between the reactances of $L_e$ and $L_m$. From the formula (1) for $k$ it is evident, therefore, that the frequency spacing between the critical frequencies, that is, between the anti-resonance and resonance as they appear in the electrical coil, is directly proportional to the magnitude of the coupling factor between the magnetostrictive element and the coil.

As explained in a paper by W. H. Bode entitled "A general theory of electric filters", published in volume 13, Journal of Mathematics and Physics, 1934, the design of numerous frequency selective electrical networks is dependent largely upon proper spacing of the critical frequencies. To give reasonably complete freedom in the design of a wide band electrical wave filter to pass a band width of $\Delta f$ frequencies, it is necessary that the effective coupling factor be approximately $$k = \frac{\Delta f}{f_0} \quad (2)$$

where $\Delta f$ is the band of frequencies in cycles and $f_0$ is the mid-band frequency in cycles. For example, where it is desired to transmit a band 3000 cycles wide centered about the frequency 60 kilocycles, the effective $k$ should be $$\frac{3,000}{60,000} = .05$$

or 5 per cent. From this relation it is evident that at lower frequencies larger coupling factors are required. For example, a 3000-cycle band at 15 kilocycles would require approximately $$k = \frac{3,000}{15,000} = .20$$

or 20 per cent. Fortunately, larger coupling factors are conveniently obtainable with devices of this invention at lower frequencies and coupling factors exceeding 20 per cent have been obtained without difficulty at 15 kilocycles.

As explained in the copending application of W. P. Mason, Serial Number 141,485, filed May 8, 1937, the proper combination of a magnetostrictive device with other reactive devices may have effects similar to those obtained by increasing the coupling factor of the magnetostrictive device so that the latter device may usually be permitted to have a somewhat smaller coupling factor than required by the relation (2). With the device of Fig. 1 employed as described in connection with Fig. 13, a coupling factor of 4 per cent proves adequate for use in a filter to pass a band 3000 cycles wide centered about 60 kilocycles.

From the above discussion and from inspection of the characteristics shown in Figs. 2 and 3, it is evident that the device of Fig. 1 has, as above stated, electrical characteristics equivalent to an electrical network of the type shown in Fig. 4, where inductance 33 is equal to $L_e$, inductance 34 is equal to $L_m$, capacity 36 is the condenser resonant with $L_m$ at 60 kilocycles, and resistances 32 and 35 are respectively the electrical and mechanical dissipations $R_e$ and $R_m$. Inductance 44 is a small auxiliary adjustable inductance coil sometimes used to obtain fine adjustments of the coupling factor as explained above. The dissipations $R_e$ and $R_m$ determine the magnitudes of $Q_e$ and $Q_m$, respectively, for by definition $$Q_e = \frac{\omega L_e}{R_e} \quad (3)$$

and $$Q_m = \frac{\omega L_m}{R_m}. \quad (4)$$

$\omega$ is the quantity $2\pi f$ where $f$ is the frequency in cycles per second. Also, from formula (1) above for $k$ we may write $$L_m = L_e \times \frac{k^2}{1-k^2} \quad (5)$$

$C_m$ may then be determined from the relation $$\omega_\infty = \frac{1}{\sqrt{L_m C_m}} \quad (6)$$

where $\omega_\infty$ is $2\pi f_\infty$, $f_\infty$ being the frequency at which the anti-resonance appears in the electrical circuit. A convenient practical method of determining the equivalent electrical network of a magnetostrictive device is described hereunder in connection with the discussion of Fig. 9.

Another equivalent electrical network is a combination of a coil connected in parallel with a coil and condenser, the latter elements being connected in series. The requirements for equivalence are explained in a paper entitled "Mutual inductance in wave filters with an introduction on filter design" by K. S. Johnson and T. E. Shea, published in the Bell System Technical Journal of January 1925. As is shown in the abovementioned copending application of W. P. Mason, the devices of this invention may be used in place of their equivalent electrical networks in filters of many types, designed in accordance with any of the well-known methods of electrical filter design.

For a given physical device of this invention, a convenient practical method of determining its equivalent electrical network is to connect in series therewith, as shown in Fig. 9, a condenser 46, the electrical characteristics of which are known. The resonant and anti-resonant frequencies and the values of the resistance of the combination at these critical frequencies are then determined by measurement. A solution for the equivalent electrical network, including the electrical resistances $R_e$ and $R_m$, 32 and 35, respectively, is then readily obtainable. The resistance at resonance is for all practical purposes $R_e$ and that at anti-resonance is the sum of $R_e$ and $R_m$. With the equivalent electrical network determined, the calculation of $Q_e$ and $Q_m$ using relations (3) and (4) given above is obviously a simple matter.

The fundamental theorem covering combinations of electrical reactances such as those which may be simulated by the devices of this invention is given in a paper entitled, "A reactance theorem", by R. M. Foster, published in the Bell System Technical Journal of April 1924. This paper shows that all complex two-terminal networks containing essentially only inductive and capacitative elements may be reduced to simple series or parallel arrangements of two-element combinations and that the reactive properties of such networks are always characterized by a plurality of resonant and anti-resonant frequencies occurring alternately, the slope of the reactance curve being always positive with increasing frequency. Small dissipative components do not cause serious departures of physical networks from the reactive characteristics of corresponding dissipationless networks, though at anti-resonant frequencies the reactance is limited by dissipation to finite values and the reactance curve assumes a negative slope in changing sign in the immediate vicinity of the anti-resonance.

For the majority of practical uses, dissipative tendencies must be reduced sufficiently so that electrical efficiencies "$Q_e$" of 50 or greater and mechanical efficiencies "$Q_m$" of 300 or more may be obtained.

A method of cooperatively associating a magnetostrictive device with non-magnetostrictive electrical reactances is shown in diagrammatic form by Fig. 10 and comprises condensers 51, transformer 52, resistance 50, condenser 45 and magnetostrictive device 53 having vibrating element 21. The equivalent electrical schematic of the structure of Fig. 10 is shown in Fig. 11. This arrangement makes use of a method of obtaining effectively a negative inductance and negative resistance in the shunt arm of the equivalent T structure of the combination of a transformer and a high resistance and is a combination of the method explained in United States Patent 2,002,216 to H. W. Bode, issued May 21, 1935 and the method explained on pages 85 and 86 of the above-mentioned paper on Wave filters by Johnson and Shea.

In Fig. 10, 52 is the transformer with windings connected in series-aiding and 50 is the high shunting resistance required by the Bode arrangement. The equivalent T of this combination appears in Fig. 11 as series resistances 55, series inductances 54, the negative shunt inductance 56 and the negative shunt resistance 57. These latter two annul part the positive inductance 33 and the positive resistance 32, respectively, of the magnetostrictive device. This increases the effective efficiency of the magnetostrictive device and raises the resonant frequencies. It offers another means of controlling the spacing of the critical frequencies of the magnetostrictive device and widening the limits within which desired spacings of the critical frequencies may be obtained. The series inductances 54 contributed by the transformer 52 when combined with the proper series condensers 51 in accordance with well-known principles of electrical network design, or in accordance with a modification thereof explained below, complete a broad band wave filter having a transmission characteristic such as is shown in Fig. 12. The series resistances 55 are the price paid for the improved efficiency and increased sharpness of resonance of the shunt arm and contribute a small but uniform loss throughout the transmission band.

A magnetostrictive device of this invention arranged as shown in Fig. 13 may be made the equivalent of a band filter having the schematic shown in Fig. 14 and providing transmission characteristics such as are shown by curve 62 in Fig. 15. In Fig. 13 the electrical coils 58 are equal, have a mutual inductance M and are connected in series-opposing. The equivalent band filter of Fig. 14 has equal series arms 59 having the value $L-M$ and a shunt arm consisting of the inductance 60 of the value M and an anti-resonant combination 61 having the value of $$\frac{Z_M}{2}$$

where $Z_M$ is the impedance induced in the coils 58 of Fig. 13 by magnetostrictive action of the element 21. It should be noted that this device employs both the ordinary mutual inductive coupling between the two coils in accordance with the principles of the previously mentioned paper by Johnson and Shea and the coupling arising from the magnetostrictive action of the member 21, the two effects acting cooperatively in producing the desired transmission characteristics.

It is well known in the filter art that the attenuation to unwanted frequencies of filter structures having configurations of elements similar to that indicated in Fig. 14 can be approximately doubled by adding a series condenser of appropriate capacity in each series arm, as indicated in Fig. 17, and increasing the inductances in the series arms to obtain the desired characteristics. It is, however, frequently found that filters having a configuration of the type shown in Fig. 17 when designed in accordance with the well-known formal methods require series inductances that are inconveniently large. For example, compare $L_{1'}$ of the "3 element structure" with $L_{1K}$ of the "4 element structure" shown on page 42 of the paper entitled, "Theory and Design of Uniform and Composite Electric Wave Filters", by O. J. Zobel, published in the Bell System Technical Journal in January 1923, where it is shown that the series inductance of the three-element structure is inversely proportional to the sum of the cut-off, or band-edge frequencies, $f_1$ and $f_2$, whereas the series inductance of the four-element structure is inversely proportional to the difference between these frequencies. Numerically we find for a 3000-cycle band centered about 60 kilocycles, $$\frac{L_1'}{L_{1K}} = \frac{1}{40}$$

that is, $L_{1K}$ must be forty times as large as $L_{1'}$ and for a 100-cycle band centered about 60 kilocycles, $$\frac{L_1'}{L_{1K}} = \frac{1}{1200}$$

In many instances it is impossible to economically construct inductance coils, for the formally designed "4 element" and similar structures, of sufficient efficiency to avoid excessively large transmission loss in the transmitting band. As a practical matter losses greater than 10 decibels in the transmitting band of a filter are usually not tolerable.

It has also been found difficult to adapt magnetostrictive devices for use in filters having the configuration shown in Fig. 17 and designed in accordance with the formal methods mentioned above, since inconveniently large coupling factors for the magnetostrictive devices are frequently required.

It has been found, however, that a modification of the formal design which accepts the largest values conveniently obtainable for the series inductances and modifies the series condensers so that each series arm resonates at the mid-frequency of the transmitting band, is entirely satisfactory for many purposes. Such a modified design requires an appreciably smaller coupling factor for the magnetostrictive device and furnishes nearly as much attenuation outside the transmitting band as a corresponding section of formal design. The increased attenuation obtainable by the modified design having the configuration of Fig. 17 as compared with the attenuation obtainable by the design having the configuration of Fig. 14 is illustrated in Fig. 15, curve 62 being the attenuation corresponding to the latter and curve 63 being that corresponding to the former. The magnetostrictive device of Fig. 16 must have a somewhat greater coupling factor than that of Fig. 13, if it is to pass a frequency band of equal width about the same mid-band frequency, but may otherwise be similar to it.

Many other applications and modifications within the spirit and scope of the invention will occur to persons skilled in the art and no effort has here been made to be exhaustive.

What is claimed is:

1. A magnetostrictive device having one vibrating element and having in its electrical impedance-frequency characteristic a plurality of critical frequencies non-harmonically related and having adjustable polarizing means so that the coupling factor of the device and the frequency intervals between the critical frequencies may be adjusted.

2. In a magnetostrictive device, a vibrating element manufactured of an alloy containing 45 parts of nickel, 5 parts of molybdenum and the balance of iron, said element having large magnetostrictive properties, a low magnetic saturation point and imparting to said device a practically constant inductance-temperature characteristic.

3. In an electrical network a transformer, a high resistance, and a magnetostrictive device arranged as a bridged-T network and proportioned with respect to each other to provide a transmission band, the magnetostrictive device being wholly in the shunt branch and the high resistance being bridged across the series arms of the T network, said transformer and said high resistance being employed to obtain effectively a negative inductance and a negative resistance in the circuit branch of the magnetostrictive device the negative resistance effect being proportioned to substantially annul the positive resistance of the magnetostrictive device at frequencies in the neighborhood of the resonant frequency of said device and the negative inductive effect being proportioned to produce a particular spacing of the critical frequencies of said device, whereby limitations of the said device are overcome and the resulting network characteristic is improved.

4. In a magnetostrictive device, a vibrating element having dissimilar cross-sectional areas for a plurality of portions of the element symmetrically distributed about its center and permanent magnets disposed to longitudinally polarize the magnetostrictive member, the positions of said magnets relative to said member being adjustable so that the degree of polarization may be adjusted.

5. The network of claim 3 in combination with three condensers, one in series with each series arm and one in series with the shunt arm, the capacities of said condensers being so proportioned with respect to the electrical properties of the other elements of said network that the combination has the characteristics of an electrical wave filter transmitting a particular band of frequencies, the discrimination of said combination against frequencies outside said transmitted band being greater than for the said network alone and an increased degree of freedom in design of the combination over design of the network alone being thereby afforded.

6. A magnetostrictive vibrator comprising a bar of magnetostrictive material, an electrical coil electromagnetically coupled to said bar, and two polarizing magnets, one of said magnets being placed adjacent to each end of said bar whereby polarization of said bar is effected with a minimum of coupling between said coil and said magnets.

7. The vibrator of claim 6, the polarizing magnets being made of a mixture of powdered oxides of iron and cobalt.

8. The vibrator of claim 6 and means for accurately adjusting the positions of the polarizing magnets relative to the vibrating element.

9. A magnetostrictive device including a vibrating element of an alloy containing 45 to 90 per cent nickel, 1.6 to 5.0 per cent molybdenum and the balance iron.

EMORY LAKATOS.